United States Patent [19]

Kumazaki

[11] Patent Number: 5,017,315
[45] Date of Patent: May 21, 1991

[54] METHOD AND APPARATUS OF JUDGING QUALITY OF INJECTION MOLDED PRODUCTS

[75] Inventor: Hiroshi Kumazaki, Numazu, Japan

[73] Assignee: Toshiba Kikai Kabushiki Kaisha, Tokyo, Japan

[21] Appl. No.: 595,701

[22] Filed: Oct. 10, 1990

Related U.S. Application Data

[63] Continuation of Ser. No. 275,987, Nov. 25, 1988, abandoned.

[30] Foreign Application Priority Data

Nov. 25, 1987 [JP] Japan .................. 62-296370
Nov. 25, 1987 [JP] Japan .................. 62-296371
Nov. 25, 1987 [JP] Japan .................. 62-296372

[51] Int. Cl.$^5$ ................ B29C 45/77; B29C 45/78
[52] U.S. Cl. ................ 264/40.1; 264/40.6; 425/135; 425/144; 425/149; 425/170
[58] Field of Search ............ 264/40.1, 40.3, 40.5, 264/40.6, 40.7, 328.1; 425/135, 143, 144, 145, 149, 156, 160, 161, 162, 166, 170

[56] References Cited

U.S. PATENT DOCUMENTS

| | | | |
|---|---|---|---|
| 3,807,914 | 4/1974 | Paulson et al. | 425/149 |
| 3,932,083 | 1/1976 | Boettner | 425/149 |
| 4,208,176 | 6/1980 | Salerno | 425/149 |
| 4,240,996 | 12/1980 | Hunkar | 425/149 |
| 4,311,446 | 1/1982 | Hold et al. | 425/145 |
| 4,326,255 | 4/1982 | Fujita | 425/145 |
| 4,680,151 | 7/1987 | Fujita et al. | 264/40.3 |
| 4,740,148 | 4/1988 | Fujita et al. | 425/170 |

FOREIGN PATENT DOCUMENTS 3608973 9/1987 Fed. Rep. of Germany ...... 425/149

*Primary Examiner*—Jill L. Heitbrink
*Attorney, Agent, or Firm*—Cushman, Darby & Cushman

[57] ABSTRACT

The quality that is good or bad of an injection molded product is judged. The temperature T of a metal mold, of a resin in the mold cavity, barrel or nozzle of an injection molding machine is measured at a time t elapsed after comencement of a pressure holding step of the injection molding machine. The present P of resin in the mold cavity or barrel or nozzle is measured at the time t, and a time function $A = f(t)$ is calculated using the temperature T and the pressure P, where A represents a calculating parameter $T/P$, $P/T$, $T \times P$, $T+P$ or $T \pm P$. This is compared with a reference time function $Ao = f(t)$ of a shot in which satisfactory products can be obtained, with a time function $An = f(t)$ of another shot.

11 Claims, 3 Drawing Sheets ns a continuation of application No. 07/275,987, filed on Nov. 25, 1988, which was abandoned upon the filing hereof.

METHOD AND APPARATUS OF JUDGING QUALITY OF INJECTION MOLDED PRODUCTS

This is a continuation of application No. 07/275,987, filed on Nov. 25, 1988, which was abandoned upon the filing hereof.

BACKGROUND OF THE INVENTION

This invention relates to a method of judging quality (good or bad) of an injection molded product, and more particularly a method of judging the accuracy of the configuration and dimensions of the injection molded product.

According to a prior art method of judging the configuration of a product of an injection molding machine, a resin pressure or an injection pressure in a mold cavity is measured at different times during a pressure holding time to obtain a time function $P = f(t)$, then this function is compared with a function $P_1 = f(t)$ which holds when a satisfactory product is obtained. Alternatively, a function $T = f(t)$ representing a mold temperature is compared with a function $T_1 = f(t)$ representing the mold temperature at which a satisfactory product is obtained, thereby judging the quality of the molded product.

The state of the resin in the mold cavity changes in accordance with a state equation $PV = RT$ (where P: pressure, V: volume, T: temperature and R: constant). Accordingly, where the quality of the product is judged by measuring only presssure P or temperature T as in the prior art, it has been impossible to grasp volume V.

SUMMARY OF THE INVENTION

Accordingly, it is an object of this invention to provide a novel method of judging the quality of a molded product by accurately grasping the pressure and temperature of the injected resin and the configuration of a molded product.

Another object of this invention is to provide a novel method of judging the quality of a molded product by simultaneously detecting the temperature and pressure of a resin injected into a mold cavity as functions of time, thereby accurately judging the volume or configuration of the molded product.

According to this invention, there is provided a method of judging quality of an injection molded product comprising the steps of measuring a temperature T of a metal mold, of a resin in a mold cavity, barrel or nozzle, or of barrel or nozzle of an injection molding machine at a time t elapsed after commencement of a pressure holding step of the injection molding machine; measuring a pressure P of a resin in the mold cavity or barrel or nozzle of the injection molding machine at the time t; calculating a time function $A = f(t)$ using the temperature T and pressure P, where A represents a calculating parameter T/P, P/T, T×P, T+P or T±P; and comparing a reference time function $A_o = f(t)$ of a shot at which satisfactory products can be obtained with a time function $A_n = f(t)$ of another shot.

DESCRIPTION OF THE PREFERRED EMBODIMENTS

Figure 1:
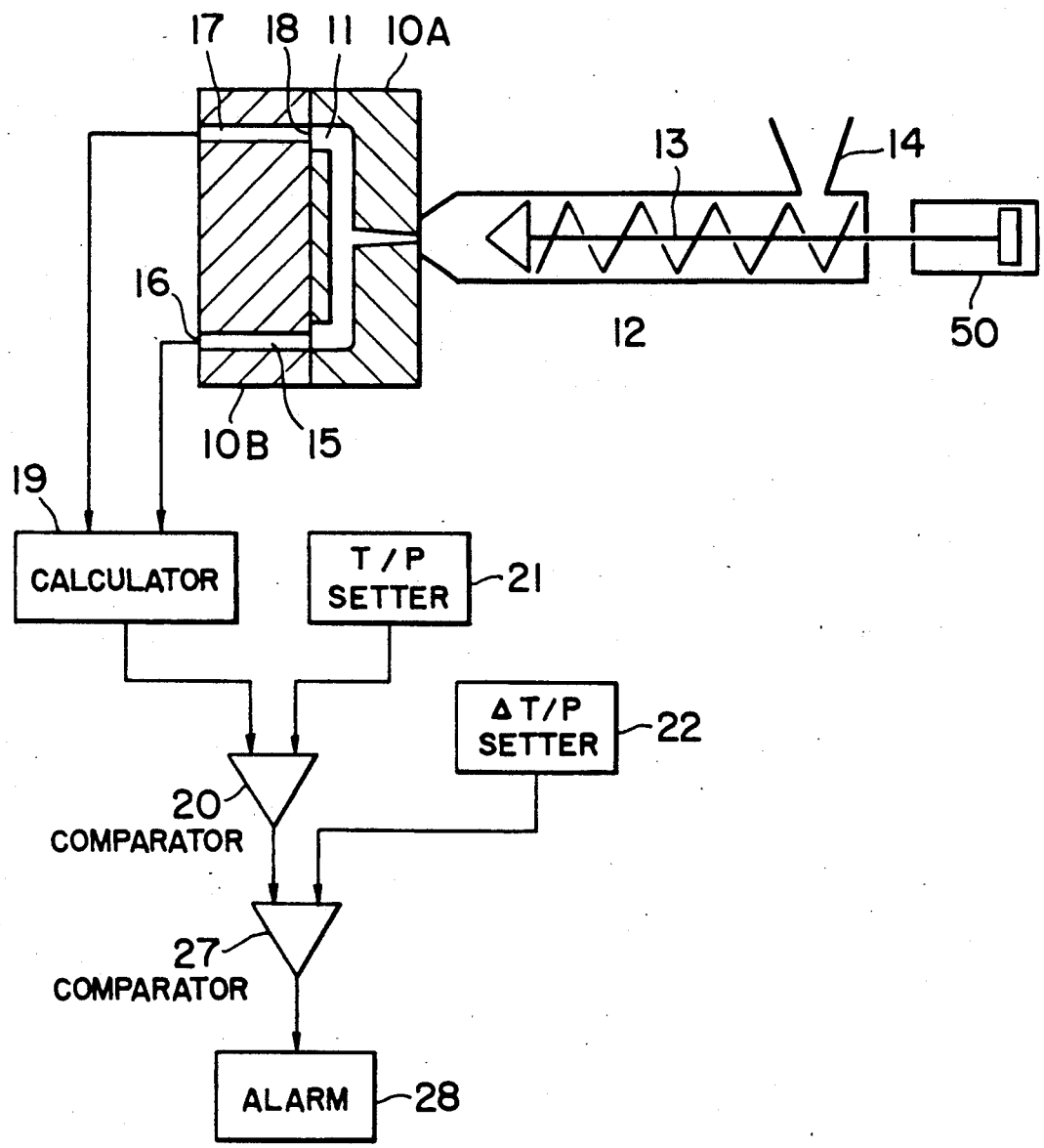
FIG. 1 shows a longitudinal sectional view of an injection molding machine and a block diagram which are utilized to carry out the method of this invention.

One embodiment of the method of this invention will be described with reference to FIGS. 1 and 2. The upper portion of FIG. 1 shows a conventional injection molding machine. More particularly, a stationary metal mold 10A and a movable metal mold 10B define a mold cavity 11 therebetween. A raw material resin supplied through a hopper 14 into a barrel 12 is heated by a heating device, not shown, provided for the outer surface of barrel 12. As the resin is moved forwardly (to the left as viewed in FIG. 1) by a screw 13 contained in the barrel 12, the resin is sequentially melted and the molten resin accumulates in a space in front of screw 13. When the quantity of the accumulated molten resin reaches a predetermined metered value, the screw is advanced while rotating from a retracted position by an oil pressure actuator 50 so that the molten resin is injected into mold cavity 11. An ejection pin 15 extending through movable metal mold 10B is normally used to eject a molded product out of mold cavity 11, but in this embodiment, a pressure sensor 16 is attached to the outer end of the ejection pin 15 for detecting the resin pressure in mold cavity 11. In the same manner, a temperature sensor 18 is attached to the inner end of another ejection pin 17 for detecting the temperature of the resin injected into mold cavity 11. A calculator 19 is provided for producing an electric signal representing a ratio T/P (temperature/pressure) using the pressure and temperature detected by pressure sensor 16 and temperature sensor 18 respectively as time functions. The output signal of calculator 19 is applied to a comparator 20 together with an output signal of a T/P setter 21 which is preset with a value necessary for obtaining a satisfactory product. An allowable or permissible value ΔT/P is set in a setter 22. Output signals of comparator 20 and setter 22 are applied to a comparator 27. The output of this comparator is supplied to an alarm device 28.

Figure 2:
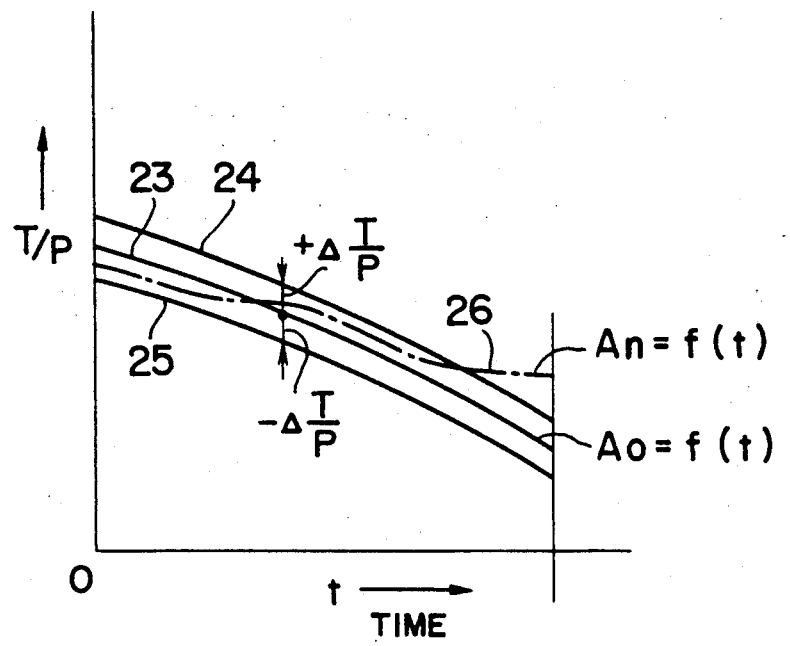
FIG. 2 is a graph utilized to judge the quality of a molded product.

In FIG. 2, 23 shows a reference line for obtaining a satisfactory product when allowable values ±ΔT/P are added to reference line 23. When the allowable values are added, the upper limit value and the lower limit value are shown by lines 24 and 25 respectively. When an actual shot line shown by dot and dash lines deviates from the upper and lower limit lines, a comparator 27 detects such deviation to operate the alarm device 28.

In the foregoing embodiment, although the resin temperature in the mold cavity and the resin pressure in the mold cavity were used, the temperature of the metal mold, or barrel or nozzle can be used, and the injection pressure or the resin pressure in the barrel or nozzle can be used.

According to this invention, as it is possible to simultaneously detect the temperature and pressure of the resin injected into the mold cavity as functions of time, it is possible to aculately judge the quality of the molded product, that is the volume or configuration thereof.

Alternatively, setter 21 is preset with the ratio T/P at any one or more times during injection and the setter 22 is preset with ΔT/P at any one or more times.

Figure 3:
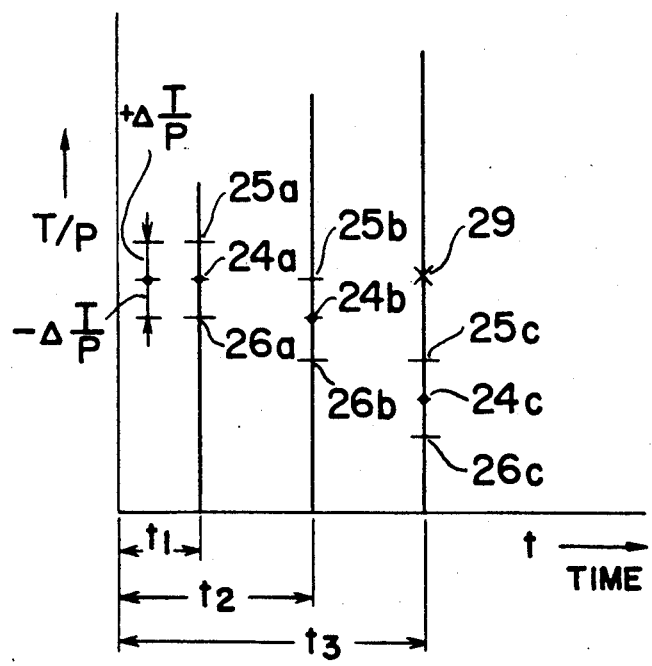
FIG. 3 is a graph similar to that shown in FIG. 2.

FIG. 3 is a graph showing this modification. Where allowable values ±ΔT/P are added to reference values 24a, 24b and 24c at times $t_1$, $t_2$ and $t_3$ which are arbitrarily set at the time of molding satisfactory products, the upper limit values become 25a, 25b and 25c while the lower limit values become 26a, 26b and 26c. Consequently, the actual shot value becomes deviate from the upper and lower limit values $25_c$ and $26_c$. Then, detector 27 detects this fact to operate alarm device 28.

Figure 4:
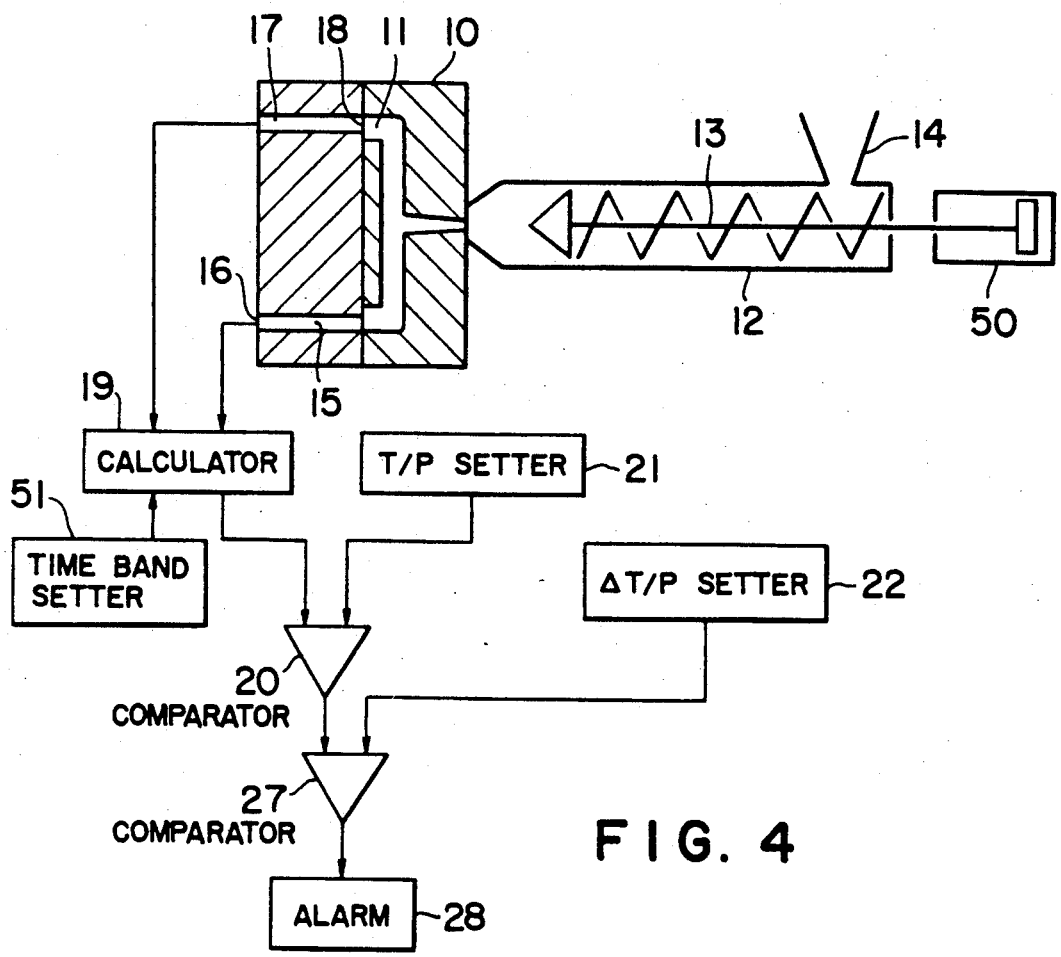
FIG. 4 is a view similar to that shown in FIG. 1 and showing a modified block diagram.
Figure 5:
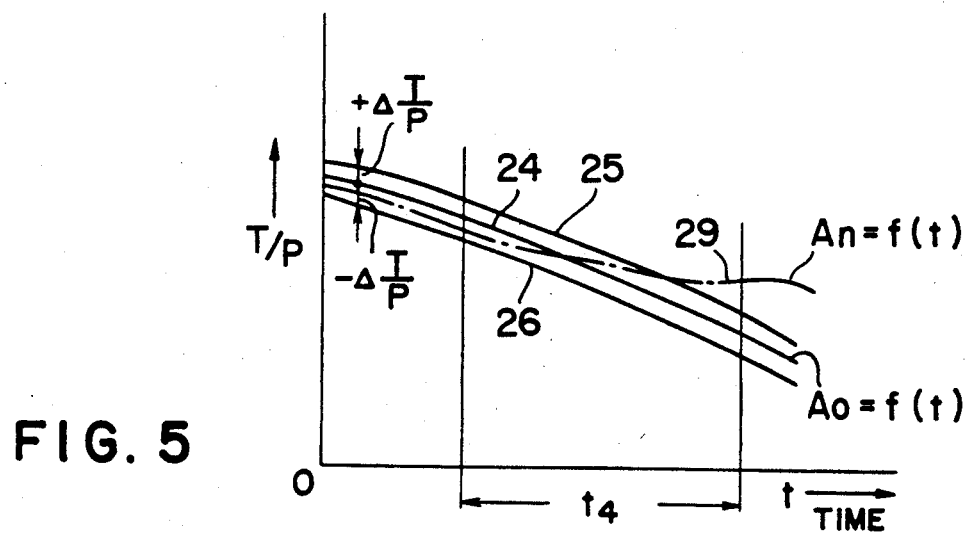
FIG. 5 is a graph similar to that shown in FIG. 2.

In still another embodiment shown in FIG. 4, instead of measuring mold temperature T and resin pressure P in accordance with time t elapsed after commencement of the pressure hold step, these parameters are measured in an arbitrarily determined time band $t_4$ (FIG. 5) during time t elapsed after commencement of the pressure hold step. The block diagram shown in FIG. 4 is similar to that shown in FIG. 1 except that a time band setter 51 is added, which is connected to calculator 19. Consequently, the calculator calculates the ratio T/P using the pressure detected by pressure sensor 16 and the temperature detected by temperature sensor 18 in the time band $t_4$ set in time band setter 51 as time functions. the output signal of calculator 19 is applied to comparator 20 together with the output of ΔT/P setter 22 in the same manner as in the embodiment shown in FIG. 1. The starting point of time band $t_4$ in time t is set by a timer, not shown. Use of the time band $t_4$ reduces the number of samplings more than in time t, whereby the construction of the control apparatus can be simplified.

What is claimed is:

1. A method of judging a quality of an injection molded product, comprising the steps of:
   measuring a temperature T of an operating member of an injection molding machine during a pressure holding step at a time t elapsed after commencement of said pressure holding step of said injection molding machine;
   measuring a pressure P of an operating member of said injection molding machine at said time t;
   repeating said measuring temperature and measuring pressure steps at different times during said pressure holding step;
   calculating a time function A=f(t) using both said temperature T and said pressure P, where A is a function from the group consisting of T/P, P/T, T×P, T+P or T±P at said different times;
   obtaining a reference time function having values at said different times of said pressure holding step that represent a satisfactory product;
   comparing said reference time function with the calculated time functions; and
   determining that said injection molded product is bad when said calculated time function differs from said reference time function, at any of said different times, by more than a predetermined amount.

2. The method according to claim 1 wherein said temperature T is a temperature of resin in a mold cavity of said injection molding machine.

3. The method according to claim 1 wherein said temperature T is a temperature of a metal mold of said injection metal mold.

4. The method according to claim 1 wherein said temperature T is a temperature of a barrel of said injection molding machine.

5. The method according to claim 1 wherein said temperature T is a temperature of resin in a nozzle of said injection molding machine.

6. The method according to claim 1 wherein said temperature T is a temperature of a nozzle of said injection molding machine.

7. The method according to claim 1 wherein said pressure P is a pressure of resin in a mold cavity of said injection molding machine.

8. The method according to claim 1 wherein as said pressure P is a pressure of resin in a barrel or nozzle of said injection molding machine.

9. The method according to claim 1 wherein said temperature T and pressure P are measured in a time band, a predetermined time later than commencement of said pressure holding step.

10. The method according to claim 1 wherein said temperature T and said pressure P are measured at two or more times elapsed after commencement of said pressure holding step.

11. An apparatus for determining a quality of an injection molded product, comprising:
   means for determining a plurality of times t during a pressure holding step of an injection molded product;
   means for measuring a temperature T of an operating member of an injection molding machine at each said time t;
   means for measuring a pressure P of injection molding at each said time t;
   means for calculating a function using both said temperature T and said pressure P to calculate the function at each said time t;
   means for storing a reference function having values at said plurality of times which represent a satisfactory product;
   means for comparing said function with said reference function; and
   alarm means for signalling that said product is defective when said comparing performed by said comparing means indicates that any of said functions at said plurality of times differ from said reference function for a corresponding time by more than a predetermined amount.

* * * * *